July 1, 1930.    C. W. HAWORTH    1,768,687
MACHINE AND PROCESS FOR BUILDING HELICAL CHEESES
Filed June 30, 1927    3 Sheets-Sheet 1
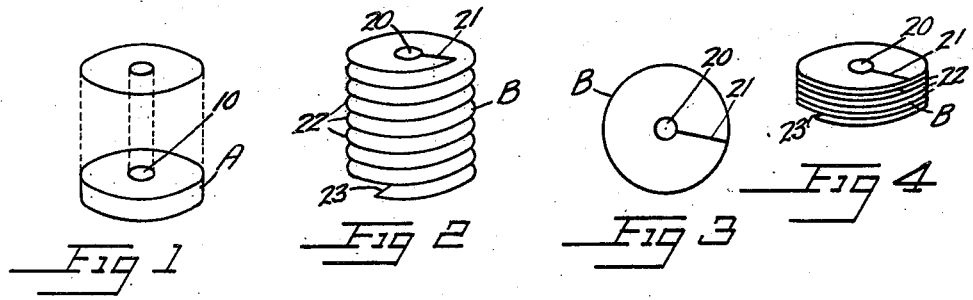
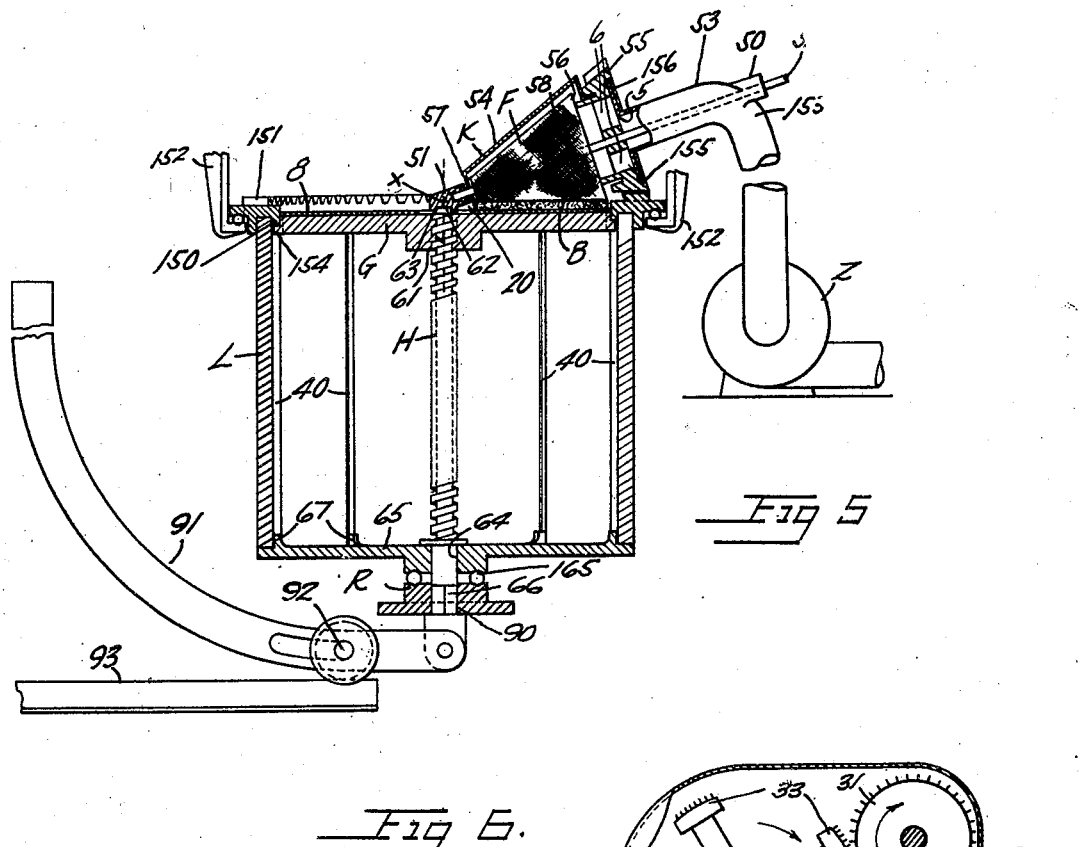

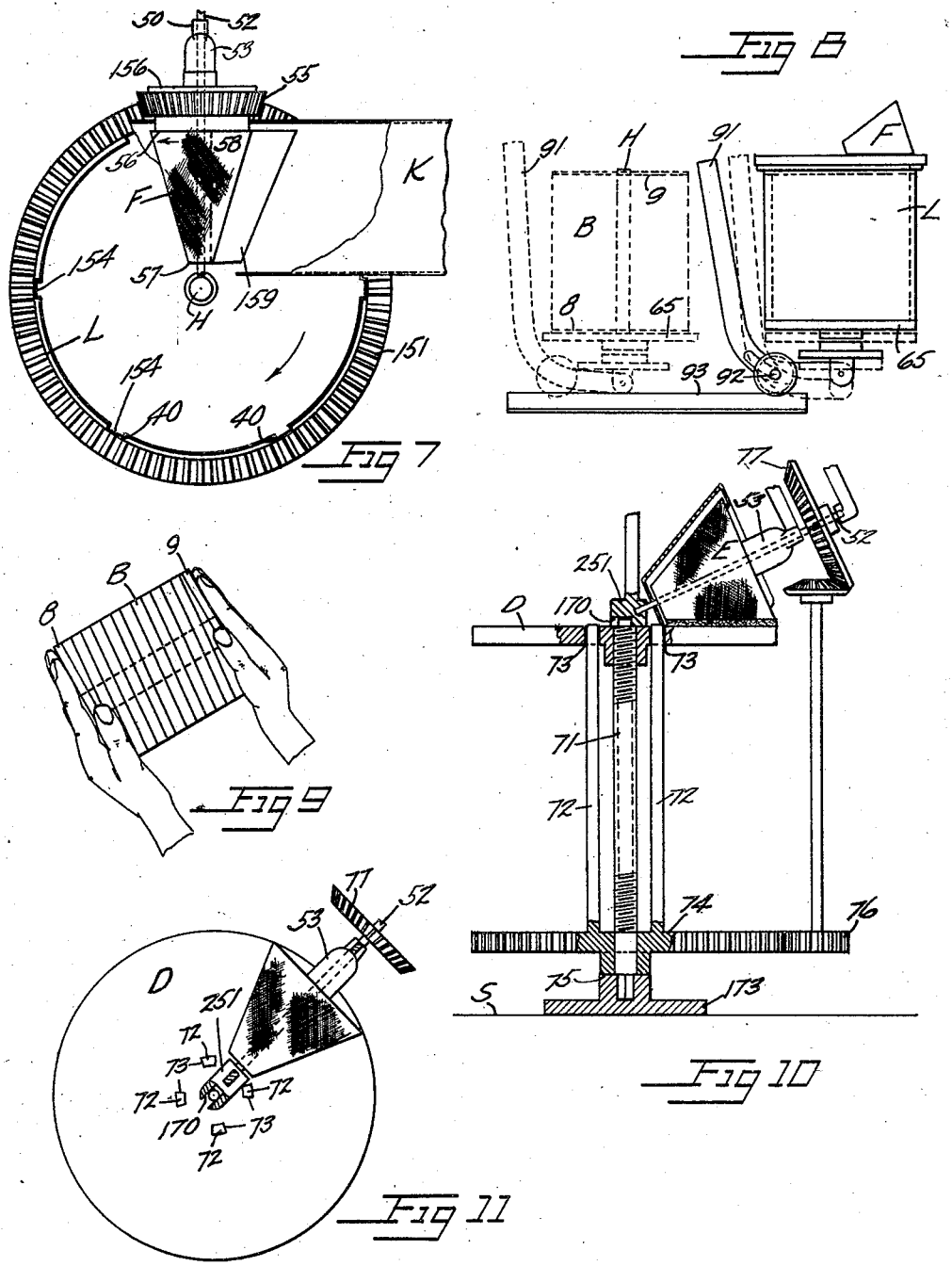

July 1, 1930. C. W. HAWORTH 1,768,687
MACHINE AND PROCESS FOR BUILDING HELICAL CHEESES
Filed June 30, 1927 3 Sheets-Sheet 3
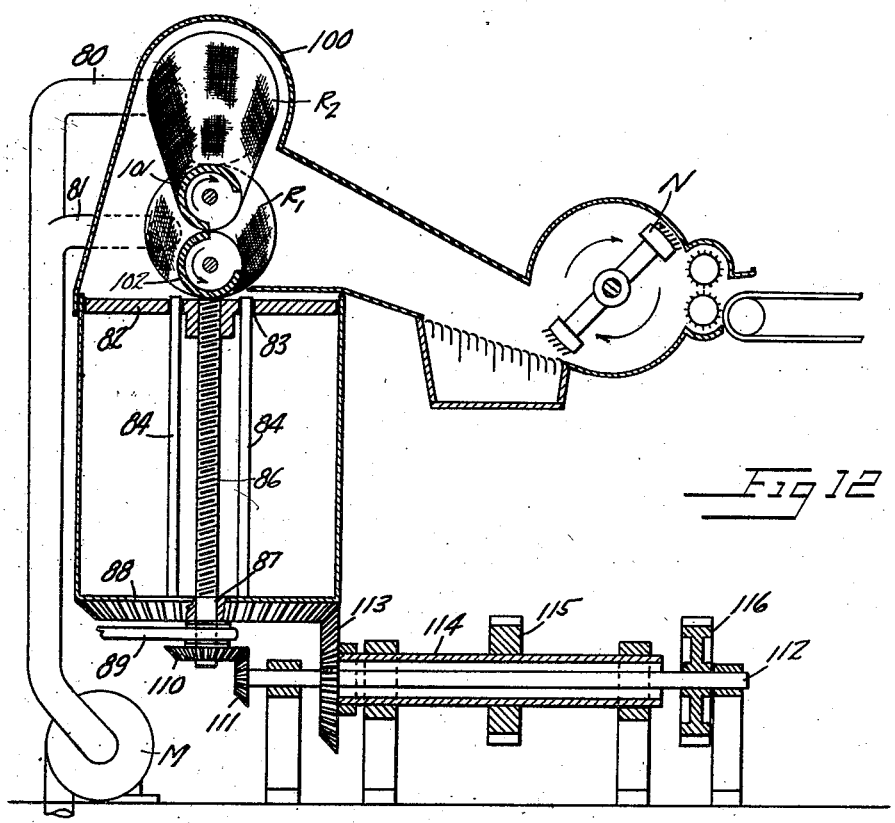
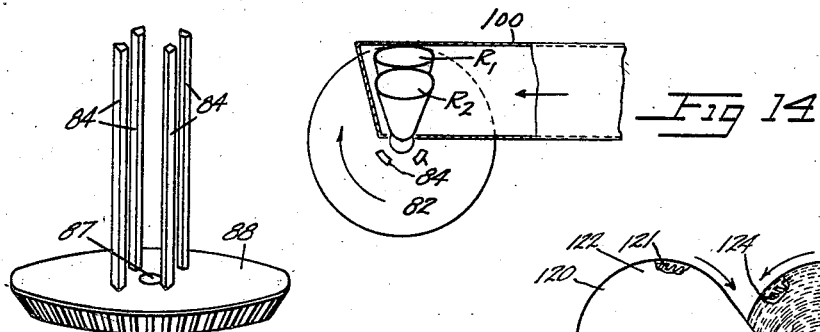
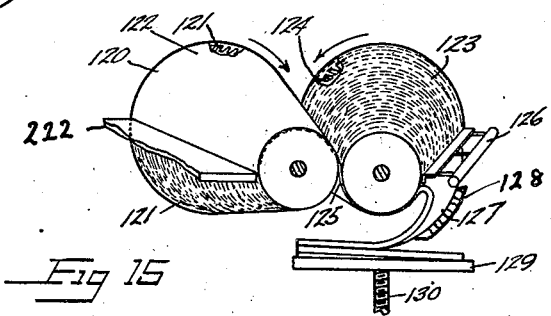

Patented July 1, 1930

1,768,687

UNITED STATES PATENT OFFICE

CHARLES W. HAWORTH, OF HOLYOKE, MASSACHUSETTS

MACHINE AND PROCESS FOR BUILDING HELICAL CHEESES

Application filed June 30, 1927. Serial No. 202,714.

My invention relates to a method of making buffing discs and buffing cylinders and a machine for carrying out my process.

These discs or cylinders are made of textile fibers and are used in the form of discs for buffing and in the form of calendar rolls which consist of a number of discs or cheeses usually made in tubs by hand, put together on an arbor such rolls being used for calendaring or smoothing cloth and paper.

Buffing discs are of various diameters and thickness according to the kind of work for which they are used. Calendar rolls are often from 12" to 30" in diameter and from 3' to 9' in length.

The usual method of building a rough cylinder, or what is known as a cheese, is to take a bat of textile material which is of substantially the same thickness throughout as it is produced by a picker and finisher lapper, and by being passed through calendar rolls, and to pull or cut therefrom oblong pieces, and to place these pieces in a cylindrical tub, preferably breaking joints until the cheese is built up.

Such a cheese of soft material 18" to 20" in height can be compressed by the hands alone to perhaps 8" or 9" in thickness, and under pressure is compressed very much more. When thoroughly compressed and compacted these cheeses are chemically treated and finished.

The general idea of my invention is to form a section of helical bat continuously on parts of the curved surface of a truncated cone, which is screened or covered with suitable material such as garnet wire, and to continuously remove this bat in such a way that one layer is superimposed upon the next thereby gradually building up a continuous helical bat in the form of a cylinder.

In carrying my process into operation by the devices disclosed, I continuously remove this bat from the cone and lay it on a receiving platform positioned directly under the cone and revolving preferably at the same surface speed with the cone and at the same time moving away from the cone a distance at each revolution which may be the same as the thickness of the bat, or which may be more or less according to the amount of fibre fed to the cone.

In the drawings, Fig. 1 is a perspective showing in full lines the finished discs, and in dotted lines part of a finished cylinder.

Fig. 2 is a perspective showing the cheese of built up spiral bat forming an uncompressed cylinder.

Fig. 3 is a top view of Fig. 2.

Fig. 4 is a perspective diagram showing graphically how the cheese shown in Figs. 2 and 3 is compressed into a disc.

Fig. 5 is a vertical sectional view of a simple form of a machine for carrying out my process.

Fig. 6 is a detail sectional elevation of my machine from the side.

Fig. 7 is a plan view of Fig. 5.

Fig. 8 is a diagram in elevation showing how my receiving platform with a built up cheese is moved down and to the side preparatory to removing the cheese.

Fig. 9 shows the cheese as it appears when first removed with its carrying discs and in the hands of the operator.

Fig. 10 is a view similar to Fig. 5 showing another type of machine which I can use.

Fig. 11 is a plan view as from the top of Fig. 10.

Fig. 12 is a sectional elevation similar to Fig. 6 and Figs. 13 and 14 are details of a modification, Fig. 13 being a perspective and Fig. 14 a diagrammatic plan view.

Fig. 15 is a diagram showing how I can utilize a truncated cone, which instead of being screened on its tapered surface, is covered with garnet wire or card clothing.

In the drawings, A represents in full lines a finished disc and in the dotted lines it represents a cheese or roll. 10 is the hole in the center.

B represents a helical bat or cheese of my construction shown in Fig. 2 as uncompressed and starting at the point 21 then turning like a spiral stair in the superimposed layers 22 and finishing at the edge 23, there being throughout the whole cheese a hole 20 for an arbor.

C represents the material which may be loose fiber, rags or felt which is placed on a feed table 30 and is worked upon by the picker mechanism D shown as consisting of feed rolls 31 and 32 which carry the edge of the material in contact with beater blades or pins 33, all being enclosed in a casing indicated by K.

This casing K extends around at 54 over a truncated cone F carried by shaft 52 supported in suitable bearings 50 and 51 which are supported by the casing K, the shaft 52 being driven by any suitable source of power.

The small end 57 of cone F is imperforate and the large end 56 is formed by the cone gear 55 having arms 6, 6, all being driven by cone shaft 52 carried at one end by bearing 51 and supported by bearing 50.

Closely fitting in an annular channel 155 in gear 55 is a disc 156 which is inperforate except for the central hole 5 around shaft 52 to which connects cone exhaust pipe 53 which bends at 153 to allow shaft 52 to pass through bearing 50 which should be air tight. The air from cone F is continuously exhausted through pipe 53 by any suitable fan or blower indicated by Z.

The surface 58 of cone F is covered with wire gauze or other foraminous material through which the air can be drawn, and on account of the internal suction, the material beaten off by the picking mechanism D, sticks to the surface 58 and forms a bat thereon. At a suitable position at the bottom of cone F is a baffle plate 59 which bears against the screen 58 on the inside and at the bottom, and cooperating with this I may use a doctor blade 159 whereby as the cone F revolves in the direction of the arrow the continuously formed spiral bat B is continuously removed.

This continuously removed bat B is delivered and laid upon a platform G which is in the nature of a large nut having a threaded hole 61 through which passes a screw H.

This screw H is the means to cause the receiving platform G to continuously move away from cone F, as G revolves.

Screw H has at the top an end 62 which enters a similar hole 63 underneath the bearing 51 for shaft 52, and at its other end as shown, passes down through a circular hole 64 in base 65 for can L.

At 66, the end of screw H is squared to enter a suitable opening 90 in the bottom support R.

This bottom support R, by means of a lever such as 91, can be moved directly down carrying with it base 65 and screw H, and then as lever 91 is on a roller pivot 92 which can roll on tracks 93, these parts can not only be dropped down carrying the can L and the cheese B but can be moved to one side to permit the removal of the cheese.

This can L is of cylindrical form, open at the bottom and top, and has guide slots such as 40, 40 adapted to engage lugs 67 on the base 65, and projections 150 from the bottom of a gear 151 carried in bearings 152, and which engages the gear 55 fixed to shaft 52.

The platform G also has lugs 154 which enter slots 40, 40 whereby as cone gear 55 revolves, it revolves gear 151 and can L which turns receiving platform G, and incidentally but not necessarily, base 65, while screw H does not turn.

I prefer to cause base 65 to turn with the can because this permits a convenient arrangement of ball-bearings 165 but can L could turn while base 65 was fixed.

In Fig. 8, I show how by means of the lever 91 the cheese, can and platform can be removed to the side, and as I prefer before starting to build the cheese, to place a thin metal disc 8 on top of G, and when about to remove it place another similar disc 9 on top of the built up cheese it will be seen that these parts can readily be removed by hand.

The can L can be lifted off and its is obvious that the screw H carrying platform G can also be lifted off, and others put in their place so that the machine is not delayed in operation while the platform G is screwed back to the top of the original screw H.

To lay the bat from the forming cone evenly on the receiving platform, the ratio between the circumference of the large end of the cone to the circumference of the platform and of the small end of the cone to the circumference of the part on which it rests should be the same, as in this way the surface speeds of contacting points of F and G are the same and there is no piling up nor drawing of the bat.

In Fig. 5 circumference of 55 is to 151 as 57 is to arbor hole 20. As shown this is as 1 to 3. In other words F, revolves three times to each revolution of G.

In Figs. 10 and 11 the cone E and associated parts are the same as in the first eight views but the can L is dispensed with and a different method is provided for revolving the platform G.

The gears 55 and 151, which drive can L and through it platform G, are dispensed with and the base 65 is substantially changed.

The receiving platform D is arranged to move down on screw 71 and it is turned by means of four vertical segmental arms 72, 72, 72, 72, which pass through suitable segmental slots 73, 73, 73, 73, in platform D.

These arms project upwardly from base 74, to which they are fixed, and which is revoluble in a suitable bearing 75, base 74 being provided with gear teeth which engage a gear 76 connected by suitable shafting and gearing with a gear 77 on shaft 52. By changing the sizes of these gears, the relative surface speed as between the surface of platform D and cone E can be changed at will.

Screw 71 is substantially the same as screw H, and platform D as it is revolved by the arms 72, and moves down at each revolution a distance equal to the pitch of the threads of screw 71.

As there is no can L nor gear 151 in the way, it is clear that by moving down the whole receiving apparatus slightly, and over to the side a distance sufficient to clear bearing 251, the helical bat or cheese B can readily be lifted off.

By forming an open bearing such as 170 in the bottom of bearing 251 to receive the top end of the screw, the necessity of dropping these parts is avoided and the base 173 can simply be slid along on the floor S until the parts are clear, and if desired, the screw can be lifted out first, before the cheese is removed.

Preferably the axis of revolution of the receiving platform shown by the dotted line in Fig. 5 should extend through the apex of the cone indicated by a cross.

In Figs. 12, 13 and 14, I show still another modification in which I use two bat building cones together with a receiving platform and screw of variable speeds.

Fig. 13 shows the driving base 88 with the upwardly projecting driving arms 84, 84, 84, 84, which are similar to 72 together with the smooth screw hole 87 while Fig. 14 is a diagrammatic plan view showing the relation of the two cones $R^1$ and $R^2$ to the receiving platform 82.

N represents the means to mix the textile fiber with a current of air and 100 represents the casing for the two cones $R^1$ and $R^2$ which are similar to F and E.

Inside each cone is a baffle plate 101 or 102 which extends part way around an inner circumference, coming together at a point at the left which is opposite the side where the textile fiber is sucked on to the surfaces of the cones by the current of air created by the exhaust pipes 80 and 81 and exhausting means M similar to Z.

The platform 82 is carried by screw 86 and has passages 83 for the driving rods 84 carried by the driving base 88, such rods passing through openings 83. The drive is similar to that shown in Figs. 10 and 11 but the driving base 88 is revoluble in suitable bearings in frame 89, and a smooth part of screw 86 passes through 88 and 89 and carries at its bottom end a bevel gear 110 which engages another bevel gear 111 carried by drive shaft 112 which can be driven by any suitable means at any desired speed as by a sprocket 116.

The driving base 88 is formed at the bottom with a bevel gear which engages a bevel gear 113 carried by hollow shaft 114 which in turn can be driven by any suitable means as a sprocket 115.

With this construction, a double bat is formed by the cones and this can be delivered at any desired ratio on the receiving platform and this platform can be caused to move away at any desired speed by changing the relative speed between its revolution and the revolutions of screw 86.

In Fig. 15 I show how I can form a continuous helical bat or web on a carding machine.

In this view, 120 represents a conical cylinder of a card having garnet wire teeth 121 which form a web 122 in the usual manner from stock 222.

123 represents a doffer which instead of being cylindrical is of truncated conical form and is shown as being covered with card clothing having garnet wire teeth 124 to which the web, as shown at 125, is transferred from the teeth 121 where it is shown at 122.

126 shows a common type of vibrating comb which removes the web 125 from the doffer as shown at 127, and 128 is a guide way which directs the web 127 on to a receiving platform 129 which revolves and moves away from doffer 123 on screw 130.

I claim:

1. In a machine for making buffing discs; the combination with a casing; of means to mix textile fibers with a current of air in such casing; a revoluble truncated cone having imperforate ends and on its tapered surface covered with foraminous material; means to remove the air from such cone; a baffle plate inside the cone proximate an opening in the casing; a doctor blade outside the cone proximate the baffle plate; a receiving platform so positioned under the doctor blade and cone that the cone extends from its rim to a point near its center, such platform being revoluble with the cone; and having its axis of revolution extending through the apex of said cone: and means operable as the platform revolves to cause it to move away from the axis of the cone.

2. In a machine for making buffing discs; the combination with a casing; of means to mix textile fibers with a current of air in such casing; a revoluble truncated cone having imperforate ends and on its tapered surface covered with foraminous material; means to remove the air from such cone; a baffle plate inside the cone proximate an opening in the casing; a doctor blade outside the cone proximate the baffle plate; a receiving platform so positioned under the doctor blade and cone that the cone extends from its rim to a point near its center, such platform being revoluble with the cone; and means operable as the platform revolves to cause it to move away from the axis of the cone.

3. In a machine for producing helical bats of textile fiber, the combination of a screened cone; with means to exhaust the air therefrom; means to deliver fiber on the outer surface thereof; means to continuously remove such fiber; a receiving platform for such removed fiber which is revoluble with the cone; and means to move the platform away from such cone as it revolves.

4. In a machine for making helical bats of textile fiber; the combination of a cone; with means to continuously form a bat thereon; means to continuously remove said bat; a receiving platform for said bat which is revoluble with the cone; and means to move the platform away from the cone as it revolves.

5. The process of forming continuous helical bats of textile material which consists of continuously forming a bat of partially truncated conical form and of continuously building it in superimposed layers to form a cylinder.

6. In a machine for making helical bats of textile fiber of substantially even thickness and consistency; the combination of a cone; means to continuously form a bat of even thickness thereon; means to continuously remove said bat; a receiving platform for said bat which is revoluble with the cone; and means to move the platform away from the cone as it revolves.

7. A helical bat of textile fiber, which is of substantially equal thickness and consistency at all points in a plane which passes through the axis of the helix.

8. The process of forming a continuous helical bat of textile material which is of greater width than its thickness and is of substantially equal thickness and consistency at all points which consists of continuously forming a bat of partially truncated conical form and of continuously building it in superimposed layers to form a cylinder.

9. A helical bat of textile fiber, each convolution of which is throughout of equal thickness and consistency.

10. A bat of textile fiber in the form of a continuous helix each convolution of which is wider than its thickness, each convolution being of substantially the same thickness and consistency throughout.

11. A bat of textile fiber in the shape of a continuous helix of such form that a cross section taken on any plane passed through the axis of the helix is oblong and of greater width than depth, the consistency of all parts of all convolutions being the same.

CHARLES W. HAWORTH.